United States Patent
Rupasinghe et al.

(10) Patent No.: US 12,537,648 B2
(45) Date of Patent: Jan. 27, 2026

(54) TIMING MIS-MATCH CALIBRATION IN DISTRIBUTED MIMO

(71) Applicant: Samsung Electronics Co., Ltd., Suwon-si (KR)

(72) Inventors: R A Nadisanka Perera Rupasinghe, Allen, TX (US); Yang Li, Plano, TX (US); Gilwon Lee, Dallas, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 18/482,803

(22) Filed: Oct. 6, 2023

(65) Prior Publication Data
US 2024/0171349 A1 May 23, 2024

Related U.S. Application Data

(60) Provisional application No. 63/426,996, filed on Nov. 21, 2022.

(51) Int. Cl.
*H04B 7/024* (2017.01)
*H04B 7/06* (2006.01)
(Continued)

(52) U.S. Cl.
CPC ......... *H04L 5/0051* (2013.01); *H04B 7/0617* (2013.01); *H04B 7/0626* (2013.01); *H04W 72/0457* (2023.01)

(58) Field of Classification Search
CPC .... H04B 7/024; H04B 7/0413; H04B 7/0456; H04B 7/0617; H04B 7/0626;
(Continued)

(56) References Cited

U.S. PATENT DOCUMENTS 10,911,201 B2 2/2021 Cheng
11,395,299 B2 7/2022 Babaei et al.
(Continued)

FOREIGN PATENT DOCUMENTS

WO 2022177381 A1 8/2022
WO 2023044630 A1 3/2023

OTHER PUBLICATIONS

International Search Report and Written Opinion issued Feb. 7, 2024 regarding International Application No. PCT/KR2023/017281, 7 pages.
(Continued)

*Primary Examiner* — Frank Duong

(57) ABSTRACT

A method of operating a network includes receiving an UL RS, estimating UL channels for a plurality of TRPS based on the UL RS, configuring first DL RS resources from an upper portion of a BWP, transmitting via the plurality of TRPs, a first beamformed DL RS from the upper portion of the BWP, and receiving via one or more of the plurality of TRPs, first CSI feedback based on the first DL RS. The method further includes configuring second DL RS resources from a lower portion of the BWP, transmitting via the plurality of TRPs, a second beamformed DL RS from the lower portion of the BWP, receiving via one or more of the plurality of TRPs, second CSI feedback based on the second DL RS, and determining a timing mis-match between the plurality of TRPs based on the first CSI feedback and the second CSI feedback.

20 Claims, 11 Drawing Sheets

(51) Int. Cl.
*H04L 5/00* (2006.01)
*H04W 72/0457* (2023.01)
(58) Field of Classification Search
CPC ...... H04B 7/0695; H04B 17/11; H04B 17/21;
H04L 5/0035; H04L 5/0048; H04L
5/0051; H04L 5/0044; H04L 25/0204;
H04L 25/0224; H04W 72/0457
See application file for complete search history.

(56) References Cited

U.S. PATENT DOCUMENTS

| | | | | |
|---|---|---|---|---|
| 11,411,778 | B2* | 8/2022 | Chen | H04B 7/0874 |
| 11,671,157 | B2 | 6/2023 | Nammi et al. | |
| 11,962,528 | B2* | 4/2024 | Hao | H04B 7/065 |
| 11,985,085 | B2* | 5/2024 | Zhu | H04L 5/0032 |
| 12,021,583 | B2* | 6/2024 | Lee | H04L 5/0053 |
| 2011/0170623 | A1 | 7/2011 | Park et al. | |
| 2018/0175992 | A1 | 6/2018 | Froberg Olsson et al. | |
| 2020/0358506 | A1 | 11/2020 | Akoum et al. | |
| 2021/0185670 | A1 | 6/2021 | Taherzadeh Boroujeni et al. | |
| 2021/0258060 | A1 | 8/2021 | Gao et al. | |
| 2021/0328742 | A1 | 10/2021 | Hao et al. | |

OTHER PUBLICATIONS

Ericsson, "On SRS enhancements targeting TDD CJT and 8 TX operation", 3GPP TSG RAN WG1 Meeting #111, R1-2212377, Nov. 2022, 19 pages.
Ericsson, "On CSI enhancements for Rel-18 NR MIMO evolution", 3GPP TSG RAN WG1 Meeting #111, R1-2212697, Nov. 2022, 62 pages.
Huawei et al., "CSI enhancement for coherent JT and mobility", 3GPP TSG RAN WG1 Meeting #111, R1-2210913, Nov. 2022, 28 pages.
Nokia et al., "CSI enhancement for high/medium UE velocities and CJT", 3GPP TSG RAN WG1 Meeting #111, R1-2212169, Nov. 2022, 21 pages.
"3rd Generation Partnership Project; Technical Specification Group Radio Access Network; Evolved Universal Terrestrial Radio Access (E-UTRA); Physical channels and modulation (Release 16)", 3GPP TS 36.211 V16.4.0, Dec. 2020, 249 pages.
"3rd Generation Partnership Project; Technical Specification Group Radio Access Network; Evolved Universal Terrestrial Radio Access (E-UTRA); Multiplexing and channel coding (Release 16)", 3GPP TS 36.212 V16.4.0, Dec. 2020, 254 pages.
"LTE; Evolved Universal Terrestrial Radio Access (E-UTRA) Physical layer procedures (3GPP TS 36.213 version 16.4.0 Release 16)", ETSI TS 136 213 V16.4.0, Feb. 2021, 577 pages.
"3rd Generation Partnership Project; Technical Specification Group Radio Access Network; Evolved Universal Terrestrial Radio Access (E-UTRA); Medium Access Control (MAC) protocol specification (Release 16)", 3GPP TS 36.321 V16.3.0, Dec. 2020, 142 pages.
"LTE; Evolved Universal Terrestrial Radio Access (E-UTRA); Radio Resource Control (RRC); Protocol specification (3GPP TS 36.331 version 16.3.0 Release 16)", ETSI TS 136 331 V16.3.0, Jan. 2021, 1089 pages.
"3rd Generation Partnership Project; Technical Specification Group Radio Access Network; NR; Physical channels and modulation (Release 16)", 3GPP TS 38.211 v16.4.0, Dec. 2020, 133 pages.
"3rd Generation Partnership Project; Technical Specification Group Radio Access Network; NR; Multiplexing and channel coding (Release 16)", 3GPP TS 38.212 v16.4.0, Dec. 2020, 152 pages.
"3rd Generation Partnership Project; Technical Specification Group Radio Access Network; NR; Physical layer procedures for control (Release 16)", 3GPP TS 38.213 v16.4.0, Dec. 2020, 181 pages.
"3rd Generation Partnership Project; Technical Specification Group Radio Access Network; NR; Physical layer procedures for data (Release 16)", 3GPP TS 38.214 v16.4.0, Dec. 2020, 169 pages.
"5G; NR; Physical layer measurements (3GPP TS 38.215 version 16.4.0 Release 16)", ETSI TS 138 215 V16.4.0, Jan. 2021, 31 pages.
"3rd Generation Partnership Project; Technical Specification Group Radio Access Network; NR; Medium Access Control (MAC) protocol specification (Release 16)", 3GPP TS 38.321 v16.3.0, Dec. 2020, 156 pages.
"3rd Generation Partnership Project; Technical Specification Group Radio Access Network; NR; Radio Resource Control (RRC) protocol specification (Release 16)", 3GPP TS 38.331 v16.3.1, Jan. 2021, 932 pages.
Extended European Search Report issued Jul. 25, 2025 regarding Application No. 23894859.0, 5 pages.
Qualcomm Incorporated, "OTA calibration for multi-TRP transmission", 3GPP TSG RAN WG1 RAN1 #89, R1-1708585, May 2017, 6 pages.

* cited by examiner

TIMING MIS-MATCH CALIBRATION IN DISTRIBUTED MIMO

CROSS-REFERENCE TO RELATED APPLICATION(S) AND CLAIM OF PRIORITY

This application claims priority under 35 U.S.C. § 119(e) to U.S. Provisional Patent Application No. 63/426,996 filed on Nov. 21, 2022. The above-identified provisional patent application is hereby incorporated by reference in its entirety.

TECHNICAL FIELD

This disclosure relates generally to wireless networks. More specifically, this disclosure relates to timing mis-match calibration in distributed MIMO.

BACKGROUND

The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure provides methods and apparatuses for timing mis-match calibration in distributed MIMO.

In one embodiment, a network entity is provided. The network entity includes a memory, and a processor operably coupled to the memory. The processor is configured to receive, via a plurality of transmit receive points (TRPs), an uplink (UL) reference signal (RS) from a user equipment (UE); estimate UL channels for the plurality of TRPs based on the UL RS; based on the UL channel estimate, configure first downlink (DL) RS resources from an upper portion of a bandwidth part (BWP); transmit to the UE, via the plurality of TRPs, a first beamformed DL RS from the upper portion of the BWP; and receive, via one or more of the plurality of TRPs, first channel state information (CSI) feedback from the UE based on the first DL RS. The processor is further configured to, based on the UL channel estimate, configure second DL RS resources from a lower portion of the BWP; transmit to the UE, via the plurality of TRPs, a second beamformed DL RS from the lower portion of the BWP; receive, via one or more of the plurality of TRPs, second CSI feedback from the UE based on the second DL RS; and determine a timing mis-match between the plurality of TRPs based on the first CSI feedback and the second CSI feedback.

In in another embodiment, a method of operating a network entity (NE) is provided. The method includes receiving, via a plurality of TRPs, an UL RS from a UE; estimating UL channels for the plurality of TRPs based on the UL RS; based on the UL channel estimate, configuring first DL RS resources from an upper portion of a BWP; transmitting to the UE, via the plurality of TRPs, a first beamformed DL RS from the upper portion of the BWP; and receiving, via one or more of the plurality of TRPs, first CSI feedback from the UE based on the first DL RS. The method further includes based on the UL channel estimate, configuring second DL RS resources from a lower portion of the BWP; transmitting to the UE, via the plurality of TRPs, a second beamformed DL RS from the lower portion of the BWP; receiving, via one or more of the plurality of TRPs, second CSI feedback from the UE based on the second DL RS; and determining a timing mis-match between the plurality of TRPs based on the first CSI feedback and the second CSI feedback.

In yet another embodiment, a non-transitory computer readable medium embodying a computer program is provided. The computer program includes program code that, when executed by a processor of a device, causes the device to receive, via a plurality of TRPs, an UL RS from a UE; estimate UL channels for the plurality of TRPs based on the UL RS; based on the UL channel estimate, configure first DL RS resources from an upper portion of a BWP; transmit to the UE, via the plurality of TRPs, a first beamformed DL RS from the upper portion of the BWP; and receive, via one or more of the plurality of TRPs, first channel state information (CSI) feedback from the UE based on the first DL RS. The computer program further includes program code that, when executed by a processor of the device, causes the device to, based on the UL channel estimate, configure second DL RS resources from a lower portion of the BWP; transmit to the UE, via the plurality of TRPs, a second beamformed DL RS from the lower portion of the BWP; receive, via one or more of the plurality of TRPs, second CSI feedback from the UE based on the second DL RS; and determine a timing mis-match between the plurality of TRPs based on the first CSI feedback and the second CSI feedback.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
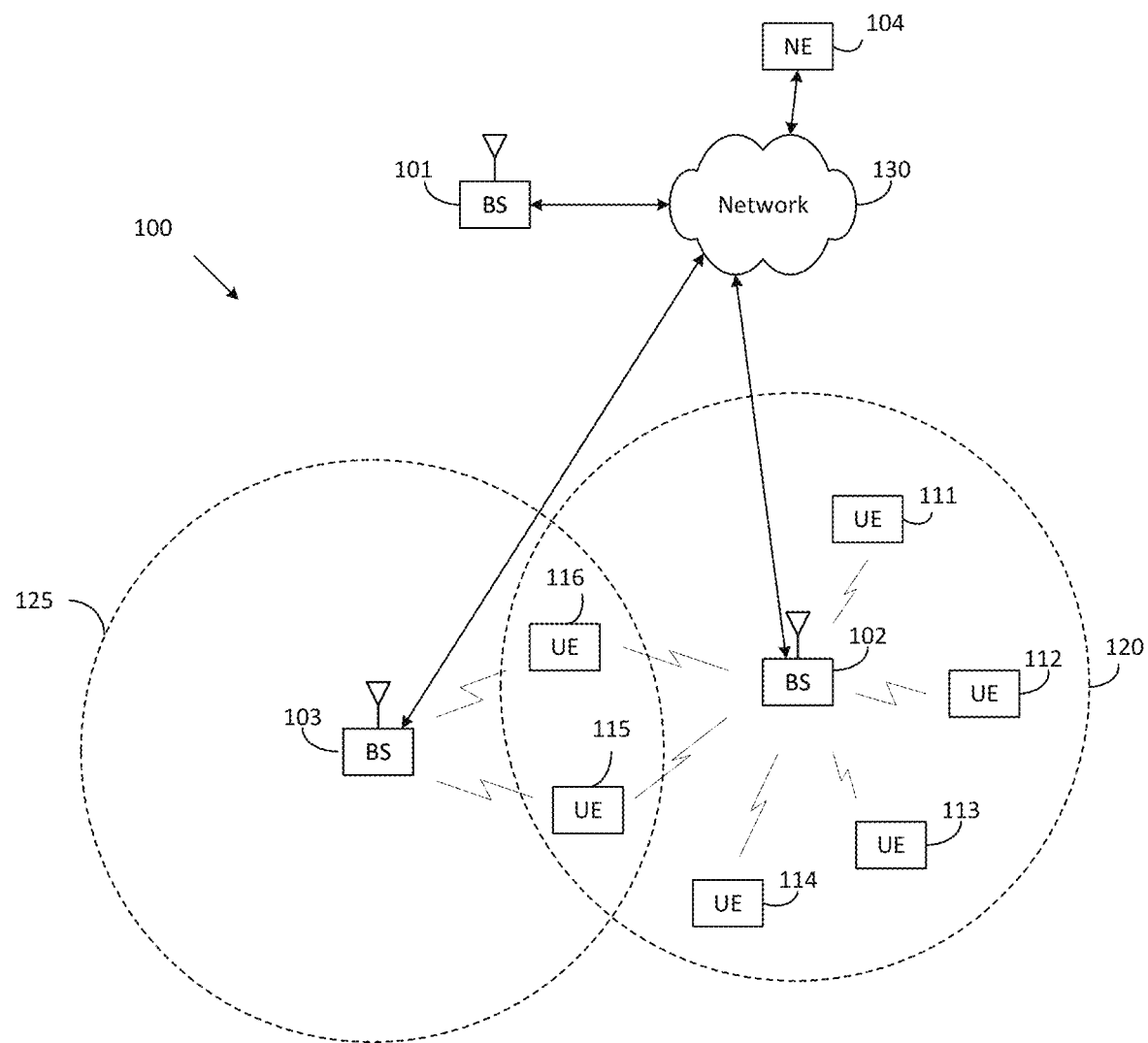
FIG. 1 illustrates an example wireless network according to embodiments of the present disclosure.

FIGS. 1 through 11, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHZ, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

The following documents and standards descriptions are hereby incorporated by reference into the present disclosure as if fully set forth herein:

[1] 3GPP TS 36.211 v16.4.0, "E-UTRA, Physical channels and modulation."

[2] 3GPP TS 36.212 v16.4.0, "E-UTRA, Multiplexing and Channel coding."

[3] 3GPP TS 36.213 v16.4.0, "E-UTRA, Physical Layer Procedures."

[4] 3GPP TS 36.321 v16.3.0, "E-UTRA, Medium Access Control (MAC) protocol specification."

[5] 3GPP TS 36.331 v16.3.0, "E-UTRA, Radio Resource Control (RRC) Protocol Specification."

[6] 3GPP TS 38.211 v16.4.0, "NR, Physical channels and modulation."

[7] 3GPP TS 38.212 v16.4.0, "NR, Multiplexing and Channel coding."

[8] 3GPP TS 38.213 v16.4.0, "NR, Physical Layer Procedures for Control."

[9] 3GPP TS 38.214 v16.4.0, "NR, Physical Layer Procedures for Data."

[10] 3GPP TS 38.215 v16.4.0, "NR, Physical Layer Measurements."
[11] 3GPP TS 38.321 v16.3.0, "NR, Medium Access Control (MAC) protocol specification."
[12] 3GPP TS 38.331 v16.3.1, "NR, Radio Resource Control (RRC) Protocol Specification."

FIGS. 1-4 below describe various embodiments implemented in wireless communications systems and with the use of orthogonal frequency division multiplexing (OFDM) or orthogonal frequency division multiple access (OFDMA) communication techniques. The descriptions of FIGS. 1-4 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the NE 104, the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 and NE 104 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for timing mis-match calibration in distributed MIMO. In certain embodiments, network entity 104 includes circuitry, programing, or a combination thereof, to support timing mis-match calibration in distributed MIMO in a wireless communication system. In certain embodiments, one or more of the gNBs 101-103 includes circuitry, programing, or a combination thereof, to support timing mis-match calibration in distributed MIMO in a wireless communication system.

Although FIG. 1 illustrates one example of a wireless network, various changes may be made to FIG. 1. For example, the wireless network could include any number of gNBs, network entities, and any number of UEs in any suitable arrangement. Also, the gNB 101 could communicate directly with any number of UEs and provide those UEs with wireless broadband access to the network 130. Similarly, each gNB 102-103 could communicate directly with the network 130 and network entity 104 and provide UEs with direct wireless broadband access to the network 130. Further, the gNBs 101, 102, and/or 103 and/or network entity 104 could provide access to other or additional external networks, such as external telephone networks or other types of data networks.

Figure 2:
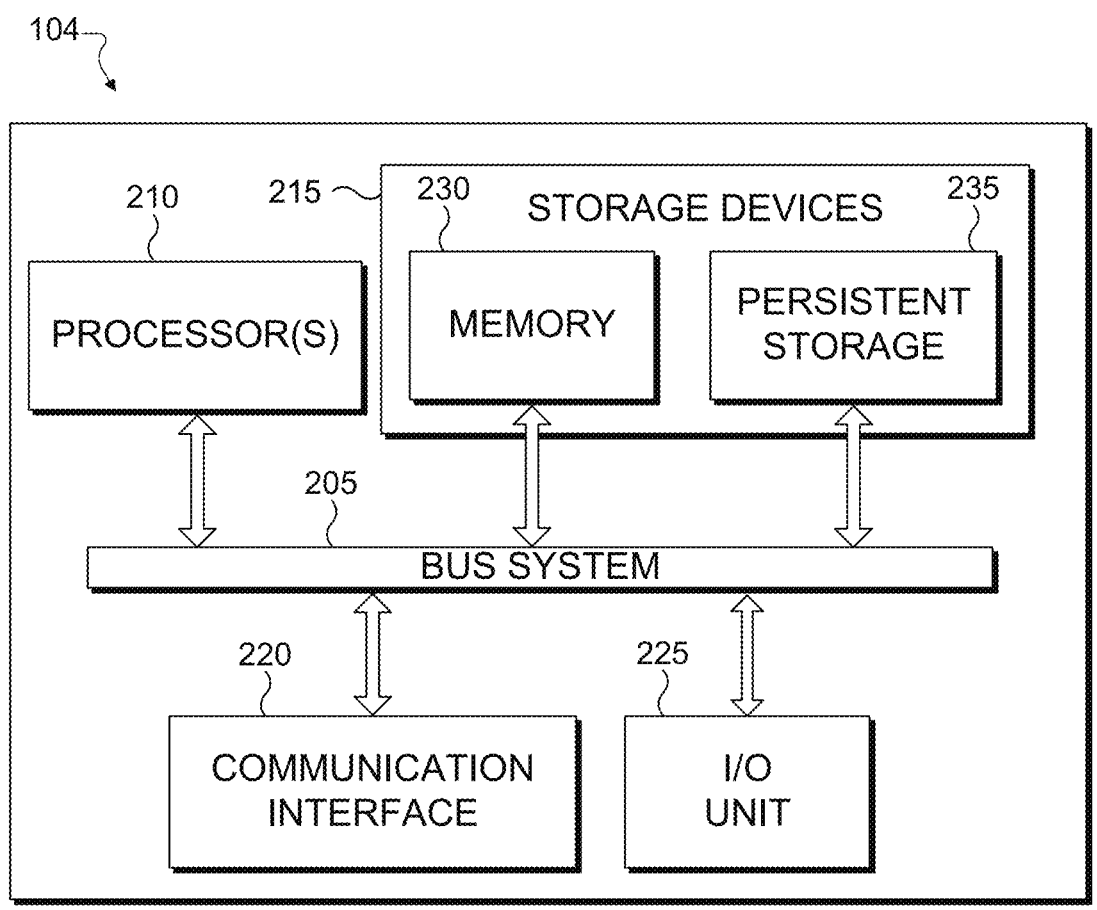
FIG. 2 illustrates an example NE according to embodiments of the present disclosure.

FIG. 2 illustrates an example NE 104 according to embodiments of the present disclosure. The embodiment of the NE 104 illustrated in FIG. 2 is for illustration only. However, NEs come in a wide variety of configurations, and FIG. 2 does not limit the scope of this disclosure to any particular implementation of an NE.

The network entity 104 can represent one or more local computing resources, remote computing resources, clustered computing resources, components that act as a single pool of seamless computing resources, a cloud-based computing resource, a virtualized computing resource, and the like. The network entity 104 can be accessed by one or more of the gNBs 101-103 and UEs 111-116 of FIG. 1 or another network entity.

As shown in FIG. 2, the network entity 104 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can execute processes to support timing mis-match calibration in distributed MIMO.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for supporting timing mis-match calibration in distributed MIMO. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit operation instructions to another device such as one of gNBs 101, 102, and 103.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the network entity 104 occur via a network connection.

While the various components of network entity 104 are illustrated as discrete components such as processor 210, memory 230, and communications interface 220, all components or a subset of components of network entity 104 may be implemented as virtual components in a virtual resource, such as a virtual machine, a virtual server, software emulation, hardware emulation, and the like. In some embodiments, network entity 104 may be a virtual resource. In some embodiments, network entity 104 may be implemented entirely as computer program code operating on a separate apparatus.

In some circumstances, network entity 104 may be integrated into another apparatus. For example, network entity 104 may be integrated into gNB 102. For instance, gNB 102 may include hardware that performs the functions of network entity 104, may include virtual resources that perform the functions of network entity 104, may include software that performs the functions of network entity 104, and/or gNB 102 may perform the functions of network entity 104 as an inherent feature of gNB 102.

In some circumstances, a network entity may be implemented across multiple apparatuses. For example, network entity 104 may be implemented across gNB 102 and gNB 103 such that gNB 102 and gNB 103 form a single network entity 104.

Note that while FIG. 2 is described as representing the network entity 104 of FIG. 1, the same or similar structure could be used in one or more of the gNBs 101, 102, and 103.

Although FIG. 2 illustrates an example network entity, various changes can be made to FIG. 2. For example, various components in FIG. 2 could be combined, further subdivided, or omitted and additional components could be added according to particular needs. As a particular example, the processor 210 could be divided into multiple processors, such as one or more central processing units (CPUs).

Figure 3:
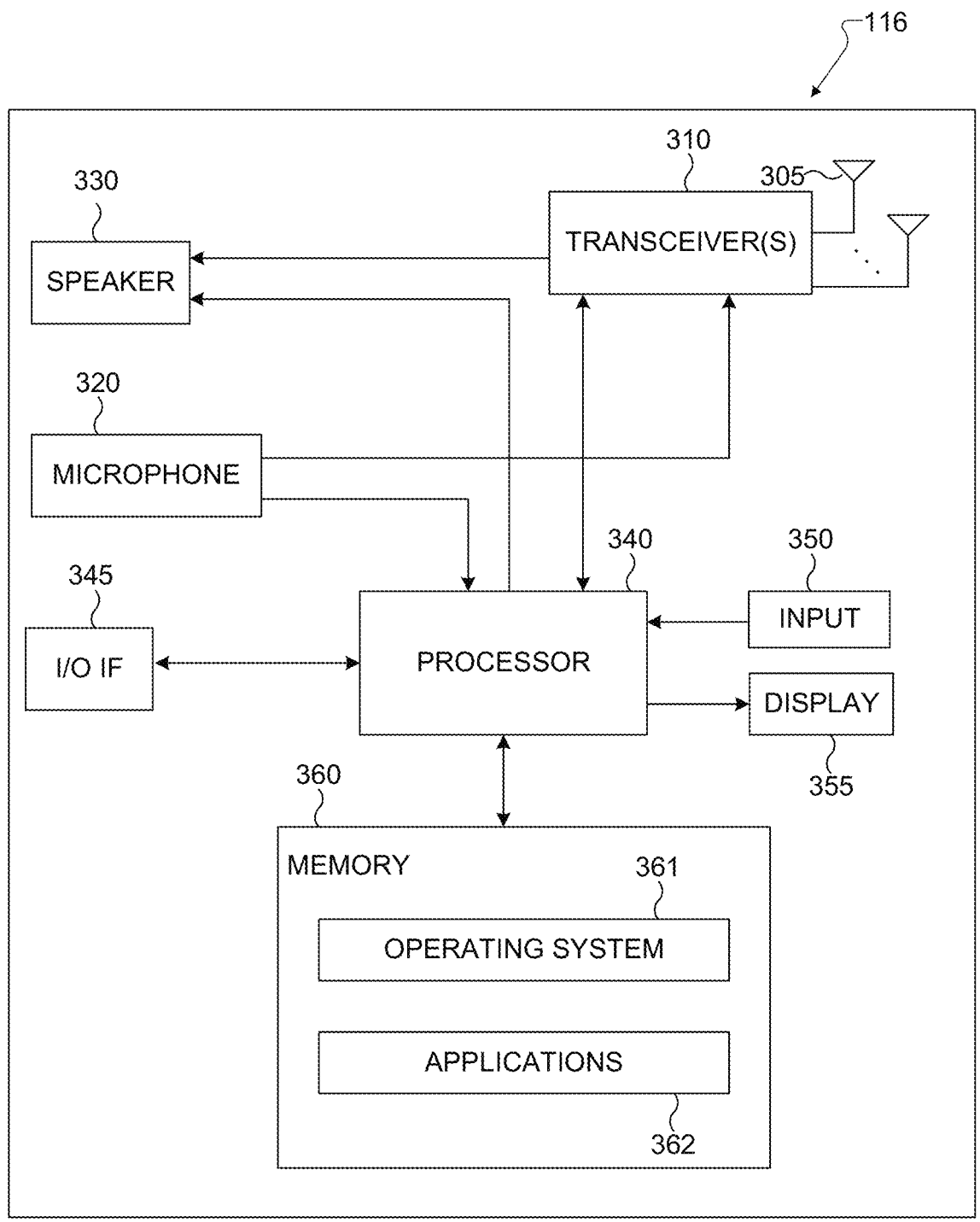
FIG. 3 illustrates an example UE according to embodiments of the present disclosure.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, for example, processes for timing mis-match calibration in distributed MIMO as discussed in greater detail below. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
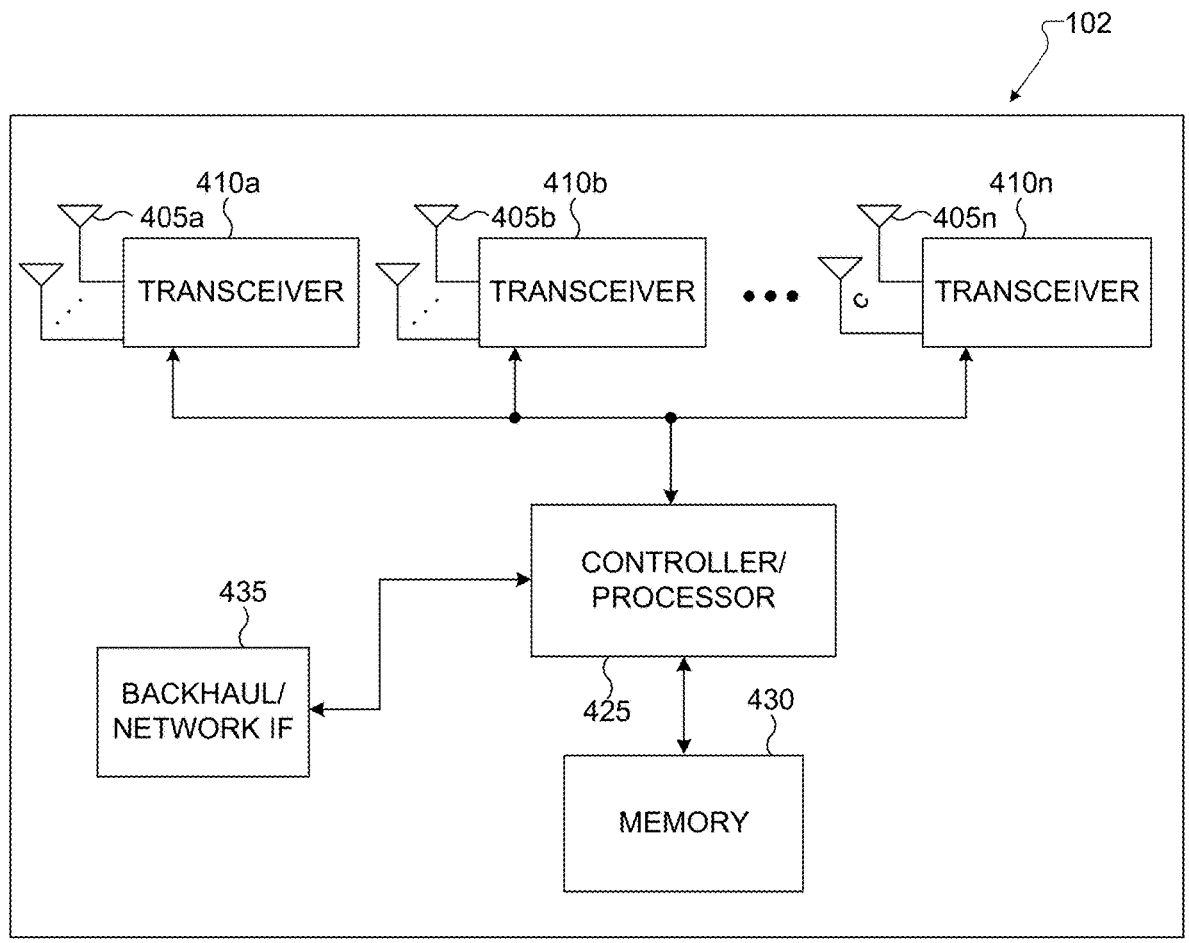
FIG. 4 illustrates an example gNB according to embodiments of the present disclosure.

FIG. 4 illustrates an example gNB 102 according to embodiments of the present disclosure. The embodiment of the gNB 102 illustrated in FIG. 4 is for illustration only, and the gNBs 101 and 103 of FIG. 1 could have the same or similar configuration. However, gNBs come in a wide variety of configurations, and FIG. 4 does not limit the scope of this disclosure to any particular implementation of a gNB.

As shown in FIG. 4, the gNB 102 includes multiple antennas 405a-405n, multiple transceivers 410a-410n, a controller/processor 425, a memory 430, and a backhaul or network interface 435.

The transceivers 410a-410n receive, from the antennas 405a-405n, incoming RF signals, such as signals transmitted by UEs in the network 100. The transceivers 410a-410n down-convert the incoming RF signals to generate IF or baseband signals. The IF or baseband signals are processed by receive (RX) processing circuitry in the transceivers 410a-410n and/or controller/processor 425, which generates processed baseband signals by filtering, decoding, and/or digitizing the baseband or IF signals. The controller/processor 425 may further process the baseband signals.

Transmit (TX) processing circuitry in the transceivers 410a-410n and/or controller/processor 425 receives analog or digital data (such as voice data, web data, e-mail, or interactive video game data) from the controller/processor 425. The TX processing circuitry encodes, multiplexes, and/or digitizes the outgoing baseband data to generate processed baseband or IF signals. The transceivers 410a-410n up-converts the baseband or IF signals to RF signals that are transmitted via the antennas 405a-405n.

The controller/processor 425 can include one or more processors or other processing devices that control the overall operation of the gNB 102. For example, the controller/processor 425 could control the reception of UL channel signals and the transmission of DL channel signals by the transceivers 410a-410n in accordance with well-known principles. The controller/processor 425 could support additional functions as well, such as more advanced wireless communication functions. For instance, the controller/processor 425 could support beam forming or directional routing operations in which outgoing/incoming signals from/to multiple antennas 405a-405n are weighted differently to effectively steer the outgoing signals in a desired direction. Any of a wide variety of other functions could be supported in the gNB 102 by the controller/processor 425.

The controller/processor 425 is also capable of executing programs and other processes resident in the memory 430, such as an OS and, for example, processes to support timing mis-match calibration in distributed MIMO as discussed in greater detail below. The controller/processor 425 can move data into or out of the memory 430 as required by an executing process.

The controller/processor 425 is also coupled to the backhaul or network interface 435. The backhaul or network interface 435 allows the gNB 102 to communicate with other devices or systems over a backhaul connection or over a network. The interface 435 could support communications over any suitable wired or wireless connection(s). For example, when the gNB 102 is implemented as part of a cellular communication system (such as one supporting 5G/NR, LTE, or LTE-A), the interface 435 could allow the gNB 102 to communicate with other gNBs over a wired or wireless backhaul connection. When the gNB 102 is implemented as an access point, the interface 435 could allow the gNB 102 to communicate over a wired or wireless local area network or over a wired or wireless connection to a larger network (such as the Internet). The interface 435 includes any suitable structure supporting communications over a wired or wireless connection, such as an Ethernet or transceiver.

The memory 430 is coupled to the controller/processor 425. Part of the memory 430 could include a RAM, and another part of the memory 430 could include a Flash memory or other ROM.

Although FIG. 4 illustrates one example of gNB 102, various changes may be made to FIG. 4. For example, the gNB 102 could include any number of each component shown in FIG. 4. Also, various components in FIG. 4 could be combined, further subdivided, or omitted and additional components could be added according to particular needs.

For a cellular system operating in low carrier frequency in general, a sub-1 GHz frequency range (e.g. less than 1 GHz) as an example, supporting large number of CSI-RS antenna ports (e.g. 32) or many antenna elements at a single location or remote radio head (RRH) is challenging due to a larger antenna form factor size needed considering carrier frequency wavelength than a system operating at a higher frequency such as 2 GHz or 4 GHz. At such low frequencies, the maximum number of CSI-RS antenna ports that can be co-located at a site (or RRH) can be limited, for example to 8. This limits the spectral efficiency of such systems. In particular, the MU-MIMO spatial multiplexing gains offered due to large number of CSI-RS antenna ports (such as 32) can't be achieved due to the antenna form factor limitation. One way to operate a system with large number of CSI-RS antenna ports at low carrier frequency is to distribute the physical antenna ports to different panels/RRHs, which can be possibly non-collocated. The multiple sites or panels/RRHs can still be connected to a single (common) base unit forming a single antenna system, hence the signal transmitted/received via multiple distributed RRHs can still be processed at a centralized location.

This present disclosure considers such a system (called distributed MIMO or multi-transmission-reception point (mTRP) or coherent joint transmission (CJT)) and provides methods to perform timing mis-match calibration for the RF receive/transmit antenna network of multiple RRHs/panels in the system to utilize DL/UL channel reciprocity, where the provided methods can be realized based on single panel codebook and feedback design.

Calibration is an important issue for distributed MIMO in general. Massive MIMO base stations use an on-board coupling network and calibration circuits, which the present disclosure refer to as the on-board calibration for brevity, to measure the gain and phase differences among transceivers in the same radio frequency (RF) unit in order to maintain the reciprocity between DL and UL channels in the time division duplex (TDD) system. For the on-board calibration, one RF chain corresponding to one antenna port serves as a reference to other RF chains for other antenna ports. In particular, timing difference between different antenna ports are also measured with respect to this reference port. In the case of the distributed MIMO, such reference transceiver's signal should be shared between distributed RRHs/panels/modules, which are physically far apart. Using RF cables to distribute the reference is not preferable as it limits the deployment scenarios. Hence, calibration for this timing mis-match between RRHs/panels is required for coherent joint-transmission with multiple TRPs.

Figure 5:
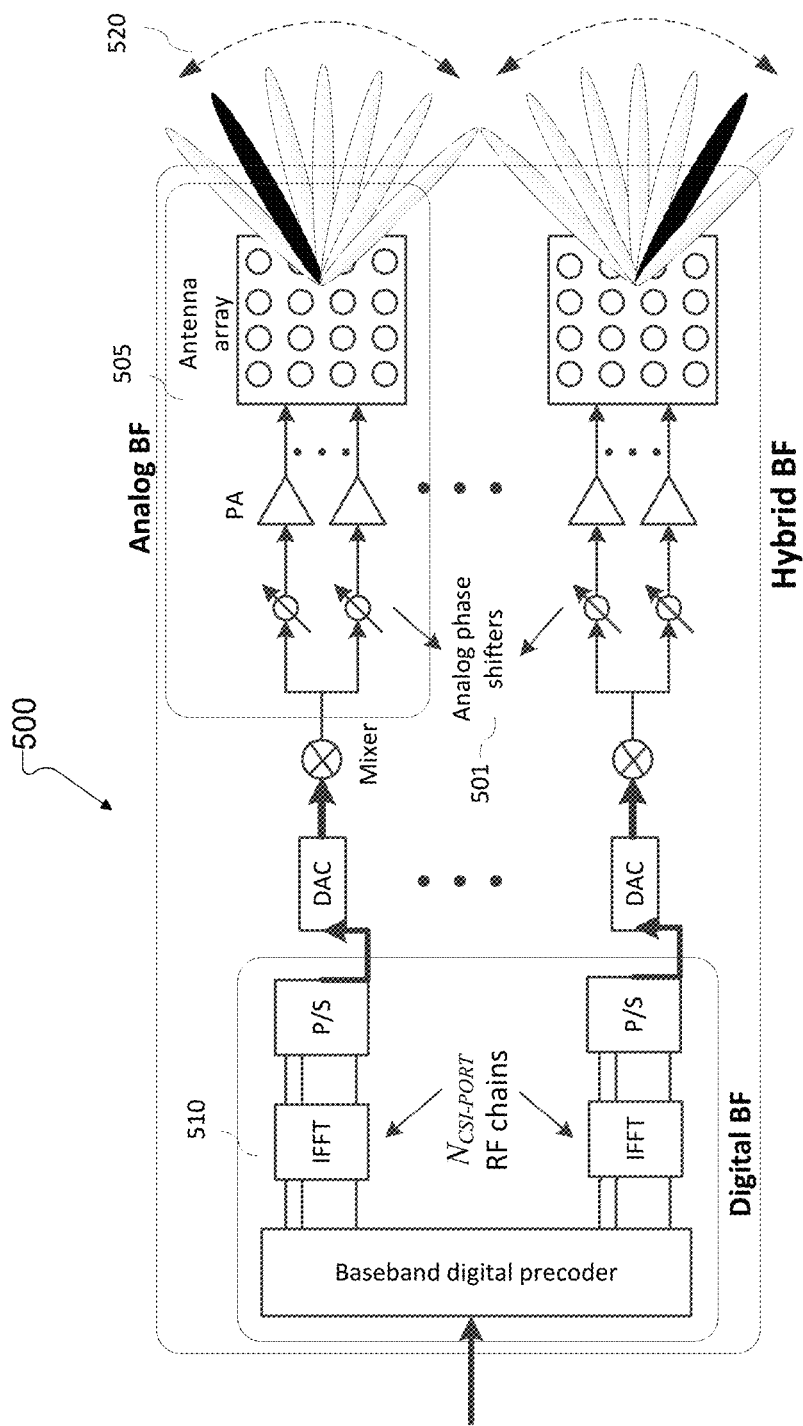
FIG. 5 illustrates an example of antenna blocks or arrays according to embodiments of the present disclosure.

FIG. 5 illustrates an example of antenna blocks or arrays 500 according to embodiments of the present disclosure. The embodiment of the antenna blocks or arrays 500 illustrated in FIG. 5 is for illustration only. Different embodiments of antenna blocks or arrays 500 could be used without departing from the scope of this disclosure.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 5. In this case, one CSI-RS port is mapped onto a large number of antenna elements which can be controlled by a bank of analog phase shifters 501. One CSI-RS port can then correspond to one sub-array which produces a narrow analog beam through analog beamforming 505. This analog beam can be configured to sweep across a wider range of angles (520) by varying the phase shifter bank across symbols or subframes. The number of sub-arrays (equal to the number of RF chains) is the same as the number of CSI-RS ports NCSI-PORT. A digital beamforming unit 510 performs a linear combination across NCSI-PORT analog beams to further increase precoding gain. While analog beams are wideband (hence not frequency-selective), digital precoding can be varied across frequency sub-bands or resource blocks. Receiver operation can be conceived analogously.

Although FIG. 5 illustrates one example of example antenna blocks or arrays 400, various changes may be made to FIG. 5. For example, the example antenna blocks or arrays 400 could include any number of each component shown in FIG. 4. Also, various components in FIG. 5 could be combined, further subdivided, or omitted and additional components could be added according to particular needs.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The above system is also applicable to higher frequency bands such as >52.6 GHz (also termed the FR4). In this case, the system can employ only analog beams. Due to the O2 absorption loss around 60 GHz frequency (~10 dB additional loss@100 m distance), larger number of and sharper analog beams (hence larger number of radiators in the array) will be needed to compensate for the additional path loss.

At lower frequency bands such as FR1 or particularly sub-1 GHz band, on the other hand, the number of antenna elements cannot be increased in a given form factor due to large wavelength if a critical distance ($\geq \lambda/2$) between two adjacent antenna elements is maintained in deployment scenarios. As an example, for the case of the wavelength size ($\lambda$) of the center frequency 600 MHZ (which is 50 cm), it requires 4 m for uniform-linear-array (ULA) antenna panel of 16 antenna elements with the half-wavelength distance between two adjacent antenna elements. Considering a plurality of antenna elements is mapped to one digital port in practical cases, the required size for antenna panels at gNB to support a large number of antenna ports, e.g., 32 CSI-RS ports, becomes very large in such low frequency bands, and it leads to the difficulty of deploying 2-D antenna arrays within the size of a conventional form factor. This can result in a limited number of physical antenna elements and, subsequently CSI-RS ports, that can be supported at a single site and limit the spectral efficiency of such systems.

Figure 6:
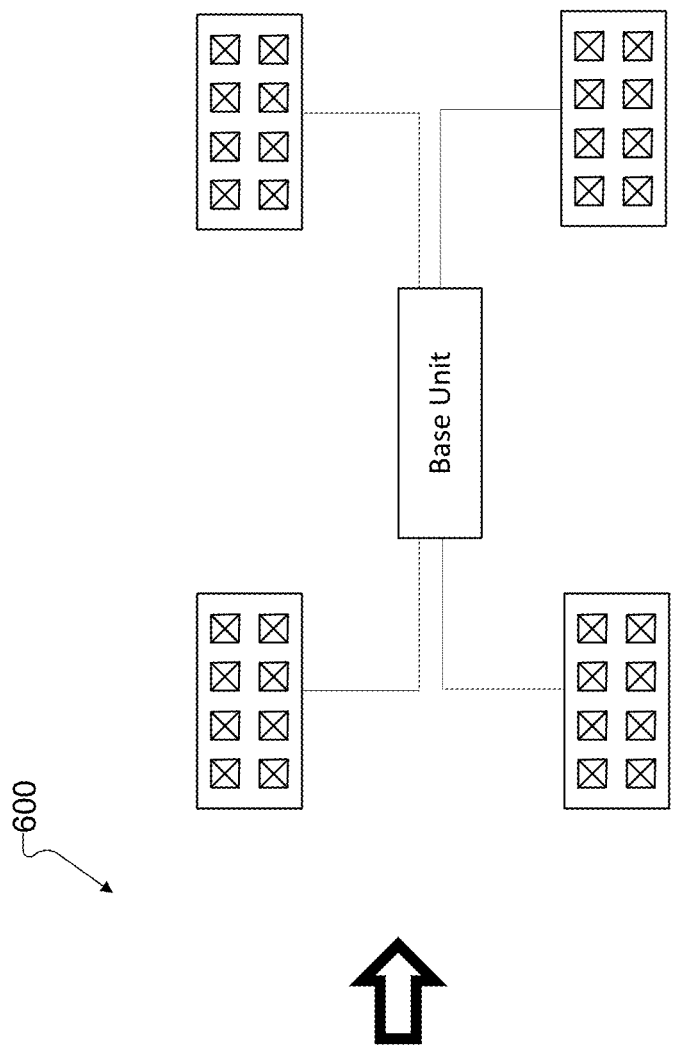
FIG. 6 illustrates an example of distributed MIMO 600 according to embodiments of the present disclosure.
Figure 6:
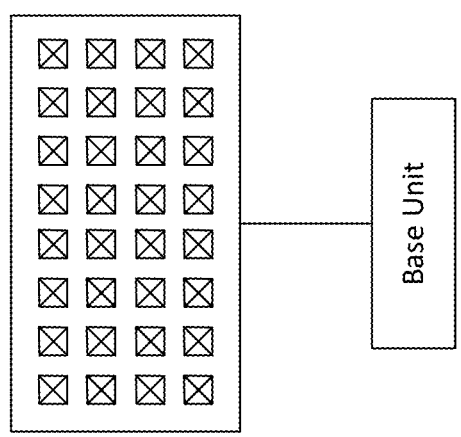

One possible approach to resolve the issue is to form multiple antenna panels (e.g., antenna modules, RRHs) with a small number of antenna ports instead of integrating all of the antenna ports in a single panel (or at a single site) and to distribute the multiple panels in multiple locations/sites (or RRHs), as illustrated in FIG. 6.

FIG. 6 illustrates an example of distributed MIMO 600 according to embodiments of the present disclosure. In the example of FIG. 6, distributed MIMO 600 is formed from multiple antenna panels, such as antenna modules or RRHs, with a small number of antenna ports instead of integrating all the antenna ports in a single panel or at a single site and distributing the multiple panels in multiple locations/sites or RRHs. The example of FIG. 6 may be implemented by a BS. For example, the example of distributed MIMO 600 may be implemented by one or more BSs such as BS 102. The MIMO 600 is for illustration only and other embodiments can be used without departing from the scope of the present disclosure.

Figure 7:
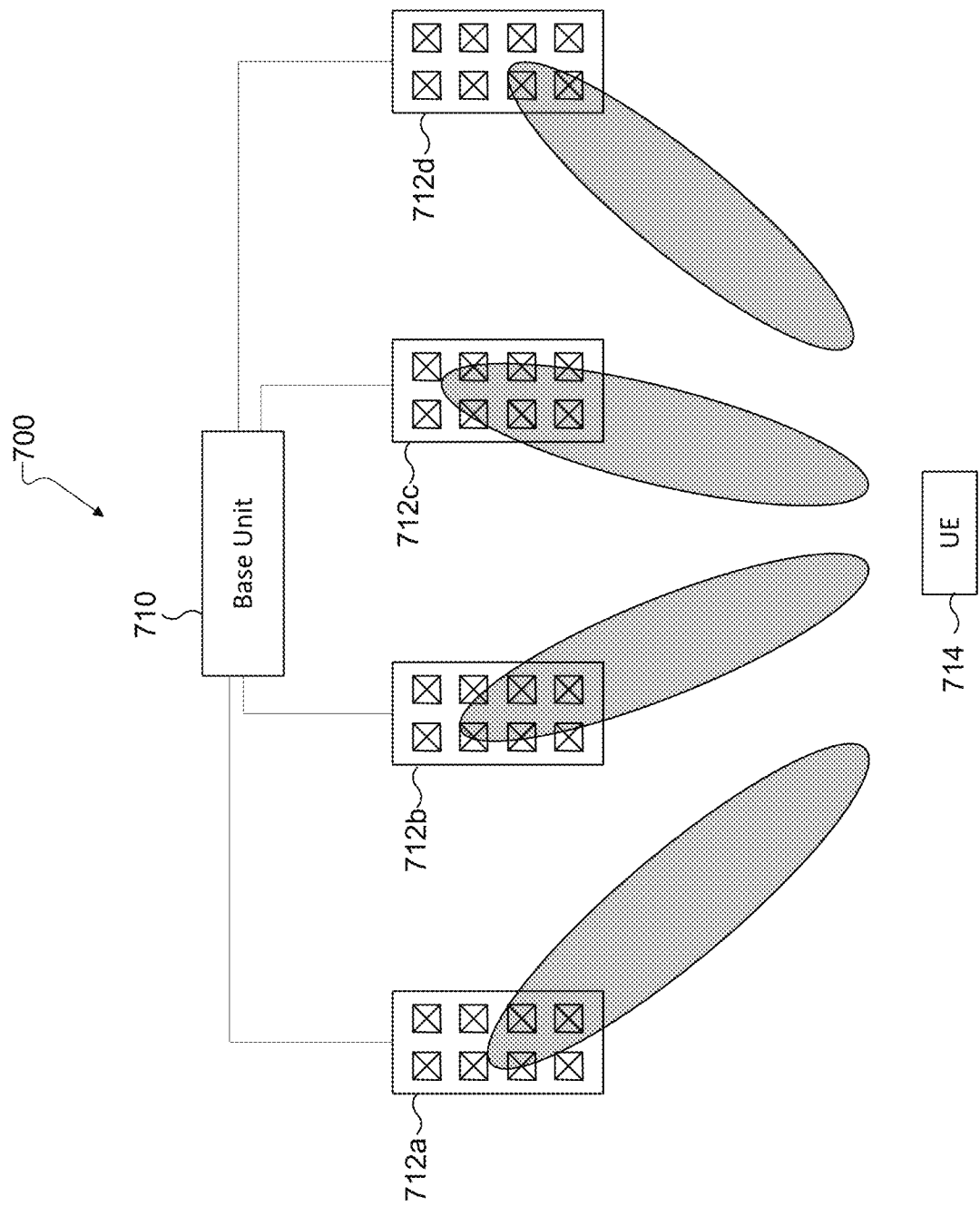
FIG. 7 illustrates an example of distributed MIMO 700 according to embodiments of the present disclosure.

The multiple antenna panels at multiple locations can still be connected to a single base unit, and thus the signal transmitted/received via multiple distributed panels can be processed in a centralized manner through the single base unit, as illustrated in FIG. 7. In another embodiment, it is possible that multiple distributed antenna panels are connected to more than one base units, which communicates with each other and jointly supporting single antenna system.

FIG. 7 illustrates another example of distributed MIMO 700 according to embodiments of the present disclosure. In the example of FIG. 7, multiple antenna locations 712-712d are connected to a single base unit 710. The base unit 710 may process signals transmitted and received via antenna locations 712a-712d in a centralized manner. For example, base unit 710 may process signals transmitted and received to UE 714. The example of FIG. 7 may be implemented by a BS. For example, the distributed MIMO 700 may be implemented by one or more BSs such as BS 102. The example of distributed MIMO 700 is for illustration only and other embodiments can be used without departing from the scope of the present disclosure.

In time division duplex (TDD), a common approach to acquire DL channel state information is to exploit UL channel estimation through receiving UL RSs (e.g., SRS) sent from a UE. By using the channel reciprocity in TDD systems, the UL channel estimation itself can be used to infer DL channels. This favorable feature enables the network (NW) to reduce the training overhead significantly. However, due to the RF impairment at the transmitter and receiver, directly using the UL channels for DL channels is not accurate and it requires a calibration process (periodically) among receive and transmit antenna ports of the RF network at the NW. In general, the NW has an on-board calibration mechanism in its own RF network to calibrate its antenna panels having a plurality of receiver/transmitter antenna ports, to enable DL/UL channel reciprocity in channel acquisition. The on-board calibration mechanism can be performed via small-power RS transmission and reception from/to the RF antenna network of the NW and thus it can be done by the NW's implementation in a confined manner (i.e., that does not interfere with other entities). However, it becomes difficult to perform the on-board calibration in distributed MIMO systems due to the distribution of the panels/RRHs over a wide region, and thus it will require over-the-air (OTA) signaling mechanisms to calibrate receive/transmit antenna ports among multiple RRHs/panels far away in distributed MIMO.

The present disclosure provides UE-assisted calibration mechanisms for distributed MIMO systems. A high-level description of multiple CSI reporting was briefly introduced in U.S. Prov. App. No. 63/153,653, which is incorporated by reference in its entirety.

Although low-band TDD systems are described for exemplary purposes, the present disclosure can be applied to any frequency band in FR1 and/or FDD systems.

All the following components and embodiments are applicable for UL transmission with CP-OFDM (cyclic prefix OFDM) waveforms as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can comprise one or multiple slots) or one slot.

Figure 8:
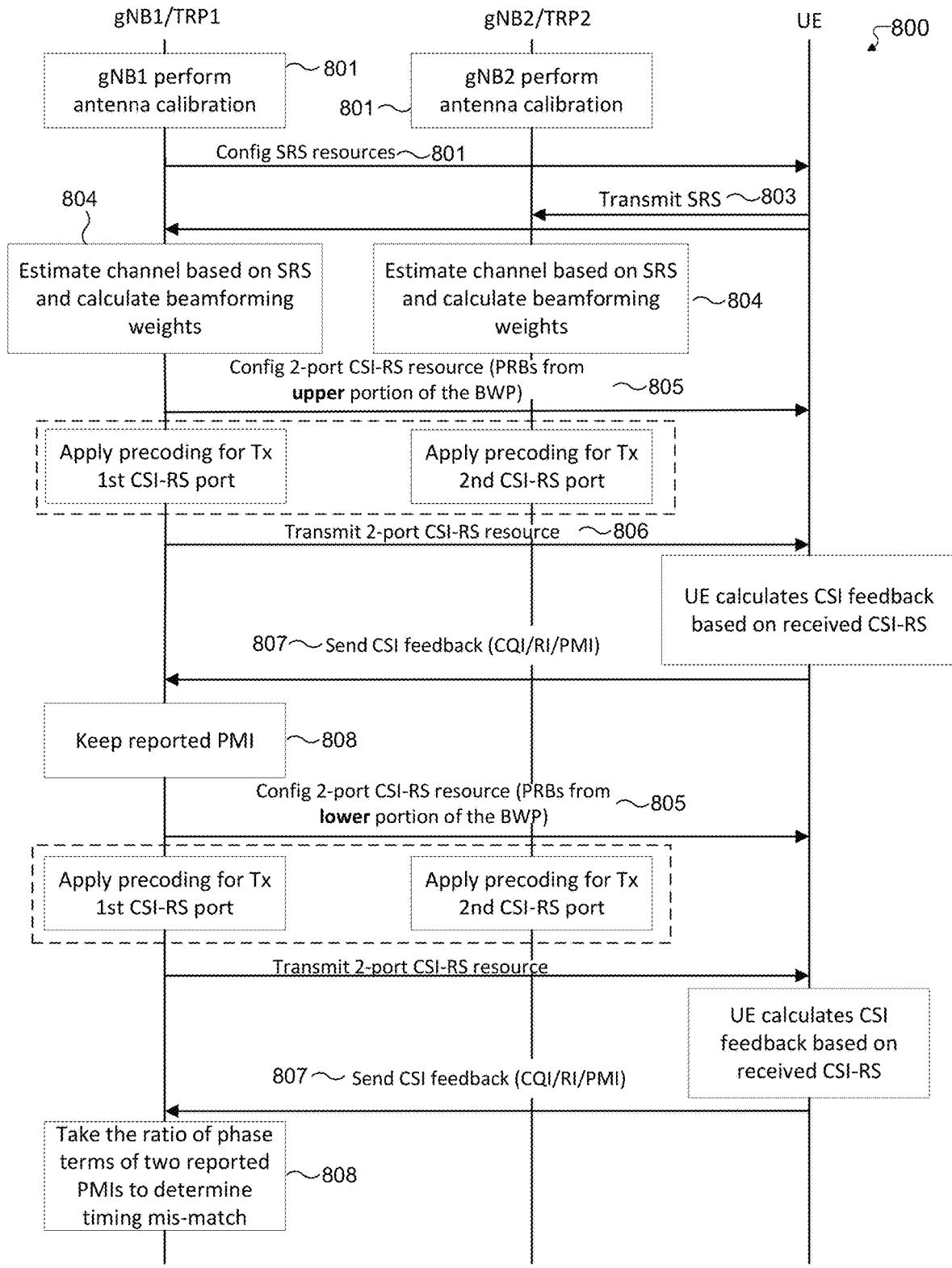
FIG. 8 illustrates an example process for a timing mismatch calibration mechanism for two or more gNBs or TRPs according to embodiments of the present disclosure.

FIG. 8 illustrates an example process 800 for a timing mis-match calibration mechanism for two or more gNBs or TRPs according to embodiments of the present disclosure. For example, the process 800 may be implemented by UE 116 and gNBs 102 and 103. The process 800 is for illustration only and other embodiments can be used without departing from the scope of the present disclosure.

FIG. 8 illustrates an example of signal flow for the timing mis-match calibration mechanism of the present disclosure among two or more gNBs or TRPs. In the example of FIG. 8 the terms gNB and TRP are used interchangeably. Also, note that the steps specified below may have the order swapped and/or skipped. Without loss of generality, FIG. 8 discusses two TRP cases, yet the method described herein can be generated for more than two TRPs. Note that in the present disclosure, the case of an antenna port of the UE 116 is discussed and it can be extended to the case of multiple antenna ports of the UE 116 by introducing another dimension. It is sufficient to discuss a single antenna port at UE 116 side because embodiments of the present disclosure provide methods for calibrating distributed antenna panels at the NW side.

The process begins at step 801. At step 801, the two TRPs 102 and 103 that participate in this across TRP calibration perform antenna calibration within the TRPs respectively. At step 802, gNB 102 will configure SRS resources for the UE 116 and then at step 803 UE 116 sends SRS that can be received at both gNB 102 and gNB 103.

In one embodiment, one of gNB 102 or gNB 103 (e.g., a serving gNB) configures an SRS resource to the UE 116 and then the UE 116 sends SRS that can be received at both gNB 102 and gNB 103.

In another embodiment, gNB 102 and gNB 103 configure SRSs respectively to the UE 116, and the UE 116 sends multiple SRSs which can be received by gNB 102 and gNB 103.

At step 804, gNB 102 and gNB 103 can estimate UL channels via the UL RS reception.

In one example, uplink channels for a given resource (e.g., RE/RB/RBG or any other given resource unit) that are estimated at each RRH/panel i can be expressed for f-th tone as $h_i^{UL}(f) = d^{-j2\pi\tau_i^{Rx} f} R_i g_i(f) t^m$, where $R_i$ is an $N_i \times N_i$ diagonal matrix with complex diagonal elements $r_1, \ldots, r_{N_i}$ and indicates the RF impairment at the receiver antenna ports of TRP i, and $g_i(f)$ is an $N_i \times 1$ channel vector for the UL physical propagation channels between UE and RRH/panel i, and $t^m$ is a complex scalar value that corresponds to the RF impairment at a transmitter antenna port m of the UE. Note here that, $\tau_i^{Rx}$ captures timing mis-match which is another RF impairment at the receiver antenna ports of TRP i.

It is worth remarking here that the UL channel $h_i^{UL}(f)$ is not the same as the actual UL propagation channels due to the RF impairment of the receiver and transmitter. Further, the corresponding DL channel for f-th tone can be expressed as $(h_i^{DL}(f))^H = e^{j2\pi\tau_i^{Tx} f} r^m g_i^H(f) T_i$, where $T_i$ is an $N_i \times N_i$ diagonal matrix with complex diagonal elements $t_1, \ldots, t_{N_i}$ and indicates the RF impairment at the transmitter antenna ports of TRP i, and $g_i^H(f)$ is an $1 \times N_i$ channel vector for the DL physical propagation channels between UE and TRP i, and $r^m$ is a complex scalar value that corresponds to the RF impairment at the receiver antenna port of the UE. The term, $\tau_i^{Tx}$ captures the timing mis-match which is a RF impairment at the transmitter antenna ports of TRP i. Here, the DL physical propagation channels are (or can be regarded to be) the same as the UL physical propagation channels within the coherence time in TDD systems.

Note that in step 801 the NW can compute calibration coefficients $$C_i = \frac{1}{\gamma_i} T_i^{-1} R_i$$

for the antenna ports within the TRP i, where $\gamma_i \neq 0$ is an arbitrary complex reference value for TRP i, and apply the calibration coefficient matrix in the RF network of TRP i to get a scaled version of DL channel from UL channel, i.e., $$(h_i^{UL}(f))^H C_i^{-1} = e^{j2\pi\tau_i^{Rx} f} \gamma_i t^m g_i^H(f) T_i. \tag{1}$$

Note that the calibration coefficients $C_i$ can be computed via on-board calibration per TRP, and $\gamma_i$ is not known to the NW.

Step 805, gNB 102 and gNB 103 configure CSI-RS resources from upper and lower portions of the BWP.

In one embodiment, one of gNB 102 or gNB 103 (e.g., a serving gNB) transmits 2-port CSI RS resource in two different time instances. In particular, in the $1^{st}$ time instance, the CSI-RS resource is configured from the upper portion of the bandwidth part (BWP). Subsequently, in the $2^{nd}$ time instance, CSI-RS resource is configured from the lower portion of the BWP.

In another embodiment, in the $1^{st}$ time instance, the CSI-RS resource is configured from the lower portion of the bandwidth part (BWP). Subsequently, in the $2^{nd}$ time instance, the CSI-RS resource is configured from the upper portion of the BWP.

Figure 9:
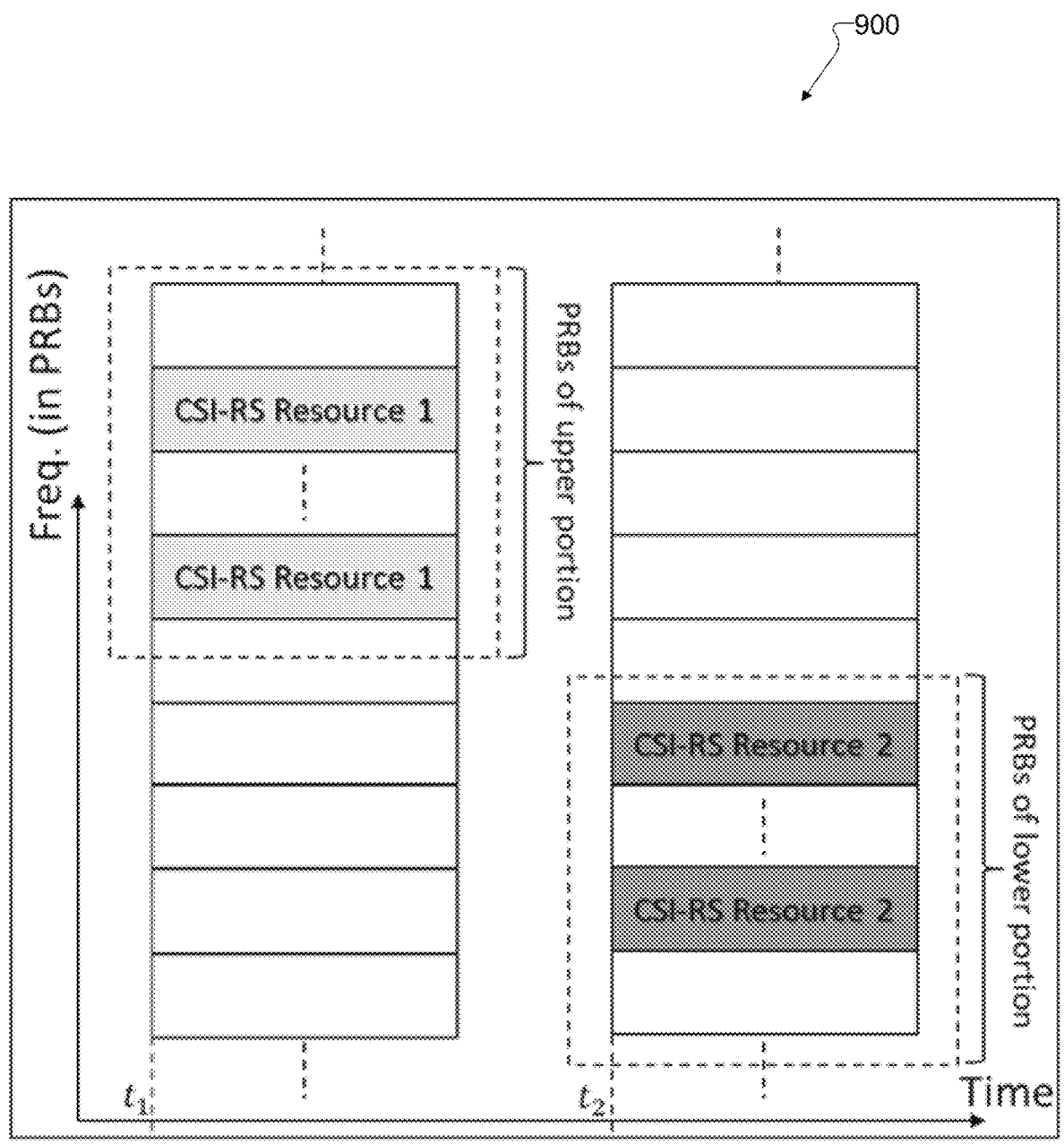
FIG. 9 illustrates an example of frequency resource allocation for CSI-RS resources according to embodiments of the present disclosure.

An example of frequency resource allocation for CSI-RS resources is illustrated in FIG. 9.

FIG. 9 illustrates an example 900 of frequency resource allocation for CSI-RS resources according to embodiments of the present disclosure. The embodiment of frequency resource allocation of FIG. 9 is for illustration only. Different embodiments of frequency resource allocation could be used without departing from the scope of this disclosure.

In the example of FIG. 9, CSI-RS resource 1 is configured with PRBs from the upper portion of the BWP. CSI-RS resource 2 is configured with PRBs from the lower portion of the BWP.

Although FIG. 9 illustrates an example 900 of frequency resource allocation for CSI-RS resources, various changes may be made to FIG. 9. For example, various changes to the PRBs, the frequency range, etc. could be made according to particular needs.

Figure 10:
FIG. 10 illustrates an example of an RRC IE CSI-FrequencyOccupation according to embodiments of the present disclosure.

In another embodiment, in order to configure CSI-RS resources from different portions of the BWP, it is possible to use the RRC information element (IE), CSI-Frequency-Occupation as captured in FIG. 10.

FIG. 10 illustrates an example 1000 of an RRC IE CSI-FrequencyOccupation according to embodiments of the present disclosure. The embodiment of the RRC IE of FIG. 10 is for illustration only. Different embodiments of RRC IEs could be used without departing from the scope of this disclosure.

Although FIG. 10 illustrates an example 100 of an RRC IE CSI-FrequencyOccupation, various changes may be made to FIG. 10. For example, various changes to the sequence, etc. could be made according to particular needs.

Referring again to FIG. 8, at step 806, gNB 102 and gNB 103 perform beamformed DL RS transmission based on UL channel estimation.

In one embodiment, based on the UL channel estimation, the NW applies beamforming or precoding for DL RS, i.e., CSI-RS, transmissions from multiple TRPs. In one example, the DL RS transmissions are performed within the coherence time of the UL RS transmission beforehand.

In another embodiment, the NW performs DL RS transmissions from multiple TRPs each with matched-filter (MF) beamforming or conjugate beamforming, i.e., $w_i(f)=\alpha_i (e^{j2\pi\tau_i^{Rx}f}\gamma_i t^m)^* T_i^H g_i(f)$, based on the UL channel estimation applied with calibration coefficient matrix as shown in eq. (1), where $\alpha_i>0$ is a designed/calculated phase and/or amplitude offset and $(A)^*$ is conjugate of A. With the MF beamforming, Rx'd signal at the UE for TRP i can be given as:

$$(h_i^{DL}(f))^H w_i(f) = e^{j2\pi(\tau_i^{Tx}-\tau_i^{Rx})f} r^m g_i^H(f) T_i \alpha_i (\gamma_i t^m)^* T_i^H g_i(f) \quad (2)$$

$$= \alpha_i e^{j2\pi\tau_i f} \gamma_i^*(t^m)^* r^m \|T_i^H g_i(f)\|^2$$

where, $\tau_i=(\tau_i^{Tx}-\tau_i^{Rx})$. In one embodiment two TRPs may transmit in the DL. In this embodiment, a 2-port CSI-RS resource is configured to UE while each TRP is assigned with a single CSI-RS port of the 2-port CSI-RS resource. Now, following (2), the Rx'd composite signal from two TRPs can be given as, $$[\alpha_1 e^{j2\pi\tau_1 f} \gamma_1^*(t^m)^* r^m \|T_1^H g_1(f)\|^2, \alpha_2 e^{j2\pi\tau_2 f} \gamma_2^* (t_m)^* r_m \|T_2^H g_2(f) \mu^2].$$

Normalized by the phase and amplitude of the first TRP, effective channel, $h_{eff}(f)$ at the UE can be given as, $$h_{eff}(f) = \left[1, \frac{\alpha_2 \gamma_2^* \|T_2^H g_2(f)\|^2}{\alpha_1 \gamma_1^* \|T_1^H g_a(f)\|^2} e^{j2\pi(\tau_2-\tau_1)f}\right]. \quad (3)$$

At step 807, UE 116 performs CSI calculation and provides feedback to gNB 102 and gNB 103.

Define $$A_i = \frac{\alpha_i \gamma_i^*}{\alpha_1 \gamma_1^*}$$

and $$B_i = \frac{\|T_i^H g_i\|^2}{\|T_1^H g_1\|^2}.$$

Note that, the objective of timing mis-match calibration is to estimate $(\tau_1-\tau_2)$ in eq. (3). Using $A_i$ and $B_i$, $h_{eff}(f)$ can be re-written as, $$h_{eff}(f)=[1, B_2 A_2 e^{j2\pi(\tau_2-\tau_1)f}].$$

Then, UE will perform PMI selection that can match the direction of the effective channel, $h_{eff}(f)$.

Let the $\ell$th PMI vector is denoted as, $P_\ell = [1, e^{\theta_{\ell,2}}, \cdots, e^{\theta_{\ell,K}}]^T$.

Then, the selected PMI shall match $h_{eff}(f)$ well, i.e., the inner product is maximized:

$$\ell_{sel}=\arg\max|h_{eff}^H(f)P_\ell|^2.$$

As a result, one may expect that $\angle A_i e^{j2\pi(\tau_1-\tau_1)f} \approx e^{\theta_{\ell sel,i}}$.

Now, for the two TRPs assigned with 2-port CSI-RS resource case, let the selected PMI vector for channel, $h_{eff}(f)$ be, $P_\ell = [1, e^{\theta_{\ell sel,2}}]^T$. (4)

As a result, $\angle A_2 e^{j2\pi(\tau_2-\tau_1)f} \approx e^{\theta_{\ell sel,2}}$.

Note that, there will be two CSI-RS transmissions with CSI-RS resources configured from different portions of the BWP. UE will feedback CSI including PMI for both these CSI-RS transmissions.

At step 808, a gNB estimates the timing mis-match $(\tau_2-\tau_1)$ between the TRPs For example, one of gNB 102 and gNB 103 may perform the estimation.

In another embodiment, given PMI feedbacks from UE for two CSI-RS transmissions, $(\tau_2-\tau_1)$ can be estimated as follows:

Let, the reported PMI at the $1^{st}$ time instance be, $P_\ell(t_1)$. Then, the term $\angle A_2 e^{j2\pi(\tau_2-\tau_1)f_1}$ can be approximated as, $$\angle A_2 e^{j2\pi(\tau_2-\tau_1)f_1} \approx e^{\theta_{\ell sel,2}}(t_1). \quad (5)$$

Similarly, the reported PMI at the $2^{nd}$ time instance be, $P_\ell(t_2)$. Then, the term $\angle A_2 e^{j2\pi(\tau_2-\tau_1)f_2}$ can be approximated as, $$\angle A_2 e^{j2\pi(\tau_2-\tau_1)f_2} \approx e^{\theta_{\ell_{sel},2}}(t_2). \qquad (6)$$

By taking the ratio between, (5) and (6), $$e^{j2\pi(\tau_2-\tau_1)(f_2-f_1)} \approx \frac{e^{\theta_{\ell_{sel},2}}(t_2)}{e^{\theta_{\ell_{sel},2}}(t_1)}$$

$$(\tau_2-\tau_1) \approx \frac{1}{j2\pi(f_2-f_1)} \times \ln\left(\frac{e^{\theta_{\ell_{sel},2}}(t_2)}{e^{\theta_{\ell_{sel},2}}(t_1)}\right). \qquad (7)$$

Note that, $(f_2-f_1)$ is due to the two CSI-RS resources configured from different portions of the BWP. Note also that, $f_2$ and $f_1$ are known to the gNB.

In one embodiment, it is possible to calibrate timing mis-match between multiple pairs of TRPs as well by using the above formulations.

In another embodiment, one TRP can act as the anchor TRP and timing mis-match for multiple TRPs can be derived as discussed previously with respect to that anchor TRP. Although FIG. 8 illustrates one example 800 for a timing mis-match calibration mechanism for two or more gNBs or TRPs, various changes may be made to FIG. 8. For example, while shown as a series of steps, various steps in FIG. 8 could overlap, occur in parallel, occur in a different order, or occur any number of times.

Figure 11:
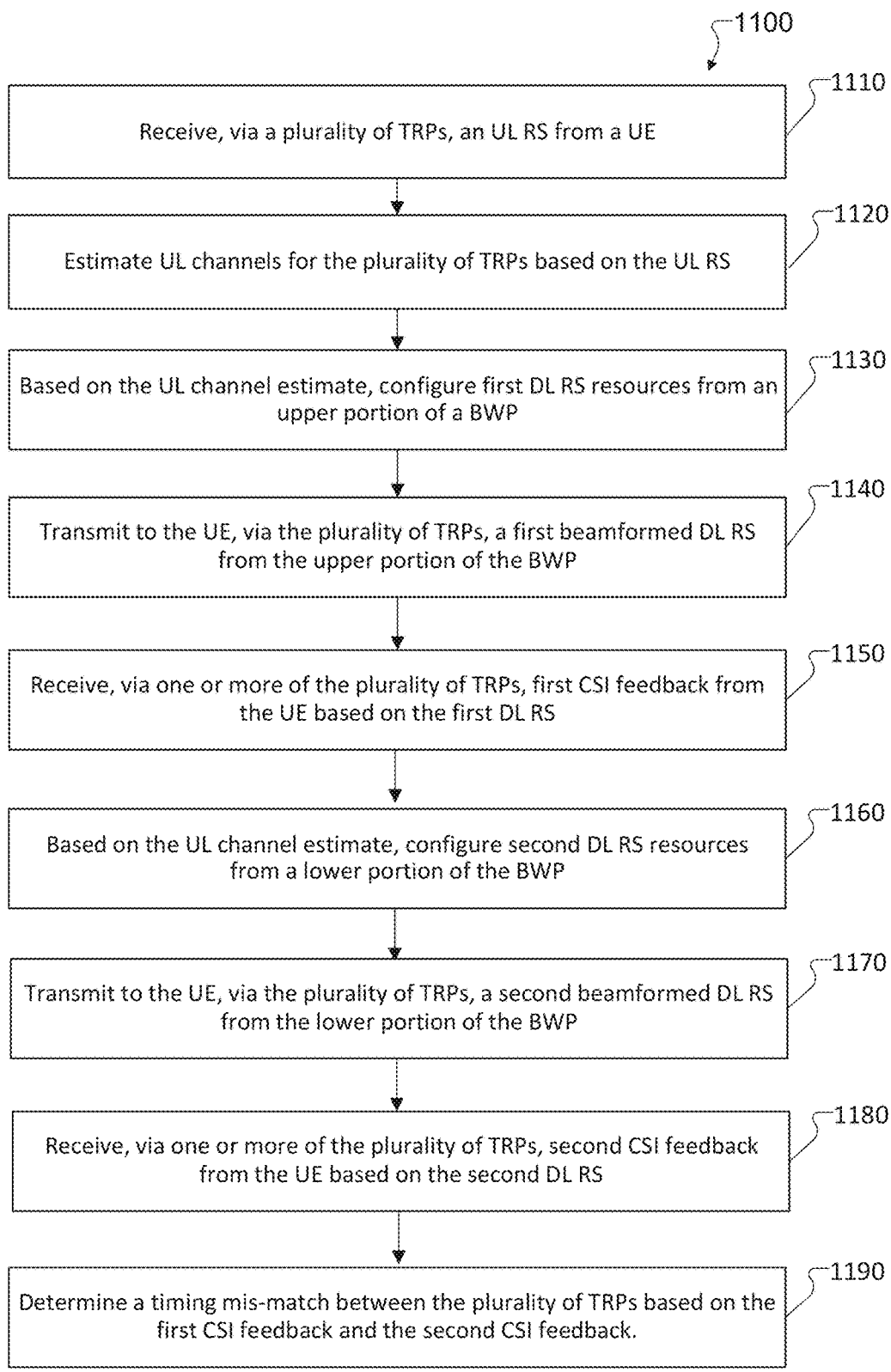
FIG. 11 illustrates a method for timing mis-match calibration in distributed MIMO according to embodiments of the present disclosure.

FIG. 11 illustrates a method 1100 for timing mis-match calibration in distributed MIMO according to embodiments of the present disclosure. An embodiment of the method illustrated in FIG. 11 is for illustration only. One or more of the components illustrated in FIG. 11 may be implemented in specialized circuitry configured to perform the noted functions or one or more of the components may be implemented by one or more processors executing instructions to perform the noted functions. Other embodiments of timing mis-match calibration in distributed MIMO could be used without departing from the scope of this disclosure.

As illustrated in FIG. 11, the method 1100 begins at step 110. At step 1110, a network entity such as gNB 102 of FIG. 1, receives, via a plurality of TRPs, an UL RS from a UE. At step 1120, the network entity estimates UL channels for the plurality of TRPs based on the UL RS. At step 1130, based on the UL channel estimate, the network entity configures first DL RS resources from an upper portion of a BWP. At step 1140, the network entity transmits to the UE, via the plurality of TRPs, a first beamformed DL RS from the upper portion of the BWP. At step 1150, the network entity receives, via one or more of the plurality of TRPs, first CSI feedback from the UE based on the first DL RS. At step 1160, based on the UL channel estimate, the network entity configures second DL RS resources from a lower portion of the BWP. At step 1170, the network entity transmits to the UE, via the plurality of TRPs, a second beamformed DL RS from the lower portion of the BWP. At step 1180, the network entity receives, via one or more of the plurality of TRPs, second CSI feedback from the UE based on the second DL RS. Finally, at step 1190, the network entity determines a timing mis-match between the plurality of TRPs based on the first CSI feedback and the second CSI feedback.

Although FIG. 11 illustrates one example of a method 1100 for timing mis-match calibration in distributed MIMO, various changes may be made to FIG. 11. For example, while shown as a series of steps, various steps in FIG. 11 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. A network entity comprising:
   a memory; and
   a processor operably coupled to the memory, the processor configured to:
      receive, via a plurality of transmit receive points (TRPs), an uplink (UL) reference signal (RS) from a user equipment (UE);
      estimate UL channels for the plurality of TRPs based on the UL RS;
      based on the UL channel estimate, configure first downlink (DL) RS resources from an upper portion of a bandwidth part (BWP);
      transmit to the UE, via the plurality of TRPs, a first beamformed DL RS from the upper portion of the BWP;
      receive, via one or more of the plurality of TRPs, first channel state information (CSI) feedback from the UE based on the first DL RS;
      based on the UL channel estimate, configure second DL RS resources from a lower portion of the BWP;
      transmit to the UE, via the plurality of TRPs, a second beamformed DL RS from the lower portion of the BWP;
      receive, via one or more of the plurality of TRPs, second CSI feedback from the UE based on the second DL RS; and
      determine a timing mis-match between the plurality of TRPs based on the first CSI feedback and the second CSI feedback.

2. The network entity of claim 1, wherein the processor is further configured to, prior to receipt of an UL RS from the UE:
   perform an antenna calibration for each TRP from the plurality of TRPs; and
   configure UL RS resources for the UE.

3. The network entity of claim 2, wherein:
   to configure the UL RS resources for the UE, the processor is further configured to configure an UL RS resource for each TRP from the plurality of TRPs for the UE; and to receive the UL RS via the plurality of TRPs, the processor is further configured to receive, via each TRP from the plurality TRPs, an UL RS corresponding to the UL RS resource configured for each respective TRP.

4. The network entity of claim 2, wherein:
to configure the UL RS resources for the UE, the processor is further configured to configure an UL RS resource for a single TRP from the plurality of TRPs; and
to receive the UL RS via the plurality of TRPs, the processor is further configured to receive the same UL RS via each TRP from the plurality of TRPs.

5. The network entity of claim 1, wherein to transmit the first and second DL RSs, the processor is further configured to transmit, via the plurality of TRPs, the first and second DL RSs within a coherence time of a UL RS reception at the plurality of TRPs.

6. The network entity of claim 1, wherein to transmit the first and second DL RSs, the processor is further configured to transmit, via the plurality of TRPs, the first and second DL RSs with matched-filter (MF) beamforming or conjugate beamforming.

7. The network entity of claim 1, wherein to determine a timing mis-match between the plurality of TRPs, the processor is further configured to:
determine an anchor TRP from the plurality of TRPs; and
determine a timing mis-match between the anchor TRP and each of the remaining TRPs from the plurality of TRPs.

8. A method of operating a network entity, the method comprising:
receiving, via a plurality of transmit receive points (TRPs), an uplink (UL) reference signal (RS) from a user equipment (UE);
estimating UL channels for the plurality of TRPs based on the UL RS;
based on the UL channel estimate, configuring first downlink (DL) RS resources from an upper portion of a bandwidth part (BWP);
transmitting to the UE, via the plurality of TRPs, a first beamformed DL RS from the upper portion of the BWP;
receiving, via one or more of the plurality of TRPs, first channel state information (CSI) feedback from the UE based on the first DL RS;
based on the UL channel estimate, configuring second DL RS resources from a lower portion of the BWP;
transmitting to the UE, via the plurality of TRPs, a second beamformed DL RS from the lower portion of the BWP;
receiving, via one or more of the plurality of TRPs, second CSI feedback from the UE based on the second DL RS; and
determining a timing mis-match between the plurality of TRPs based on the first CSI feedback and the second CSI feedback.

9. The method of claim 8, further comprising, prior to receipt of an UL RS from the UE:
performing an antenna calibration for each TRP from the plurality of TRPs; and
configuring UL RS resources for the UE.

10. The method of claim 9, wherein:
configuring the UL RS resources for the UE comprises configuring an UL RS resource for each TRP from the plurality of TRPs for the UE; and
receiving the UL RS via the plurality of TRPs comprises receiving, via each TRP from the plurality TRPs, an UL RS corresponding to the UL RS resource configured for each respective TRP.

11. The method of claim 9, further wherein:
configuring the UL RS resources for the UE comprises configuring an UL RS resource for a single TRP from the plurality of TRPs; and
receiving the UL RS via the plurality of TRPs comprises receiving the same UL RS via each TRP from the plurality of TRPs.

12. The method of claim 8, wherein transmitting the first and second DL RSs comprises transmitting, via the plurality of TRPs, the first and second DL RSs within a coherence time of a UL RS reception at the plurality of TRPs.

13. The method of claim 8, wherein transmitting the first and second DL RSs comprises transmitting, via the plurality of TRPs, the first and second DL RSs with matched-filter (MF) beamforming or conjugate beamforming.

14. The method of claim 8, wherein determining a timing mis-match between the plurality of TRPs comprises:
determining an anchor TRP from the plurality of TRPs; and
determining a timing mis-match between the anchor TRP and each of the remaining TRPs from the plurality of TRPs.

15. A non-transitory computer readable medium embodying a computer program, the computer program comprising program code that, when executed by a processor of a device, causes the device to:
receive, via a plurality of transmit receive points (TRPs), an uplink (UL) reference signal (RS) from a user equipment (UE);
estimate UL channels for the plurality of TRPs based on the UL RS;
based on the UL channel estimate, configure first downlink (DL) RS resources from an upper portion of a bandwidth part (BWP);
transmit to the UE, via the plurality of TRPs, a first beamformed DL RS from the upper portion of the BWP;
receive, via one or more of the plurality of TRPs, first channel state information (CSI) feedback from the UE based on the first DL RS;
based on the UL channel estimate, configure second DL RS resources from a lower portion of the BWP;
transmit to the UE, via the plurality of TRPs, a second beamformed DL RS from the lower portion of the BWP;
receive, via one or more of the plurality of TRPs, second CSI feedback from the UE based on the second DL RS; and
determine a timing mis-match between the plurality of TRPs based on the first CSI feedback and the second CSI feedback.

16. The non-transitory computer readable medium of claim 15, wherein the computer program further comprises computer readable program code that, when executed by the processor, causes the device to, prior to receipt of an UL RS from the UE:
perform an antenna calibration for each TRP from the plurality of TRPs; and
configure UL RS resources for the UE.

17. The non-transitory computer readable medium of claim 16, wherein to configure the UL RS resources for the UE, the computer program further comprises computer readable program code that, when executed by the processor, causes the device to configure an UL RS resource for each TRP from the plurality of TRPs for the UE; and
- wherein to receive the UL RS via the plurality of TRPs, the computer program further comprises computer readable program code that, when executed by the processor, causes the device to receive, via each TRP from the plurality TRPs, an UL RS corresponding to the UL RS resource configured for each respective TRP.

18. The non-transitory computer readable medium of claim 16, wherein to configure the UL RS resources for the UE, the computer program further comprises computer readable program code that, when executed by the processor, causes the device to configure an UL RS resource for a single TRP from the plurality of TRPs; and
- wherein to receive the UL RS via the plurality of TRPs, the computer program further comprises computer readable program code that, when executed by the processor, causes the device to receive the same UL RS via each TRP from the plurality of TRPs.

19. The non-transitory computer readable medium of claim 16, wherein to transmit the first and second DL RSs, the computer program further comprises computer readable program code that, when executed by the processor, causes the device to at least one of:
- transmit, via the plurality of TRPs, the first and second DL RSs within a coherence time of a UL RS reception at the plurality of TRPs; and
- transmit, via the plurality of TRPs, the first and second DL RSs with matched-filter (MF) beamforming or conjugate beamforming.

20. The non-transitory computer readable medium of claim 16, wherein to determine a timing mis-match between the plurality of TRPs the computer program further comprises computer readable program code that, when executed by the processor, causes the device to:
- determine an anchor TRP from the plurality of TRPs; and
- determine a timing mis-match between the anchor TRP and each of the remaining TRPs from the plurality of TRPs.

\* \* \* \* \*